United States Patent [19]
Horikawa et al.

[11] Patent Number: 6,091,420
[45] Date of Patent: Jul. 18, 2000

[54] METHOD FOR APPROXIMATING SHAPE DATA, DRAWING APPARATUS AND INFORMATION RECORDING MEDIUM

[75] Inventors: Junji Horikawa, Tokyo; Takashi Totsuka, Chiba, both of Japan

[73] Assignee: Sony Corporation, Tokyo, Japan

[21] Appl. No.: 08/987,004

[22] Filed: Dec. 8, 1997

[30] Foreign Application Priority Data

Dec. 13, 1996 [JP] Japan .............................. PO8-333933

[51] Int. Cl.⁷ .................................................. G06T 15/00
[52] U.S. Cl. ............................................................ 345/419
[58] Field of Search .................................. 345/418, 419, 345/420, 423, 424, 425

[56] References Cited

U.S. PATENT DOCUMENTS

| | | | |
|---|---|---|---|
| 4,152,766 | 5/1979 | Osofsky et al. | 364/515 |
| 4,600,919 | 7/1986 | Stern | 340/725 |
| 4,694,407 | 9/1987 | Ogden | 365/518 |
| 4,783,829 | 11/1988 | Miyakawa et al. | 382/22 |
| 4,969,204 | 11/1990 | Melinychuck et al. | 382/56 |
| 5,029,228 | 7/1991 | Nonoyama et al. | 382/56 |
| 5,040,130 | 8/1991 | Chang et al. | 364/521 |
| 5,276,786 | 1/1994 | Long et al. | 395/128 |
| 5,341,466 | 8/1994 | Perlin et al. | 395/139 |
| 5,373,375 | 12/1994 | Weldy | 358/523 |
| 5,384,904 | 1/1995 | Sprauge et al. | 395/139 |
| 5,448,686 | 9/1995 | Borrel et al. | 395/120 |
| 5,490,239 | 2/1996 | Myers | 395/129 |
| 5,506,947 | 4/1996 | Taubin | 395/133 |
| 5,590,248 | 12/1996 | Zarge et al. | 395/121 |
| 5,613,051 | 3/1997 | Iodice et al. | 395/128 |
| 5,615,317 | 3/1997 | Freitag | 395/119 |
| 5,621,827 | 4/1997 | Uchiyama et al. | 382/307 |
| 5,689,577 | 11/1997 | Arata | 382/128 |
| 5,761,332 | 6/1998 | Wischmann et al. | 382/131 |
| 5,774,130 | 6/1998 | Horikawa et al. | 345/441 |
| 5,796,400 | 8/1998 | Atkinson et al. | 345/420 |

OTHER PUBLICATIONS

M. Garland et al., "Surface Simplification Using Quadric Error Metrics," Computer Graphics Proceedings, Annual Conference Series, Aug. 3–8, 1997, pp. 209–216.
U.S. application No. 08/755,129, filed Nov. 25, 1996.
U.S. application No. 08/959,247, filed Oct. 28, 1997.
U.S. application No. 09/326,841, Jun. 7, 1999.
G. Turk, "Re–Tiling Polygonal Surface," Computer Graphics Proceedings, Annual Conference, Chicago, Jul. 26–31, 1992, pp. 55–64.
F. Schmitt et al., "An Adaptive Subdivision Method for Surface–Fitting From Sampled Data," Computer Graphics Proceedings, Annual Conference, Dallas, Aug. 18–22, 1986, vol. 20, No. 4, pp. 179–188.
H, Hoppe et al., "Mesh Optimization," Computer Graphics Proceedings, Annual Conference, Anaheim, Aug. 1–6, 1993, pp. 19–26.

*Primary Examiner*—Phu K. Nguyen
*Assistant Examiner*—Cliff N. Vo
*Attorney, Agent, or Firm*—Limbach & Limbach, LLP

[57] ABSTRACT

A method and apparatus for approximating shape data in which the degree of fineness of a desired portion is set so as to differ from that of other portions for hierarchical approximation by a facilitated designating operation. Polygon data of an original are entered and the partial degree of fineness of the polygon model is designated by the user. It is designated to which degree the model is approximated and each edge is evaluated for removing edges. The evaluated values are sorted in accordance with the magnitudes of the evaluated values and controlled responsive to designation by the user of the partial degree of approximation. An edge with the least evaluated value is selected and removed and the position of the apex points left after removing the edge are determined to see whether or not approximation has reached a desired degree of approximation. An approximated model is selected from plural hierarchies and processed for drawing or saving.

38 Claims, 17 Drawing Sheets

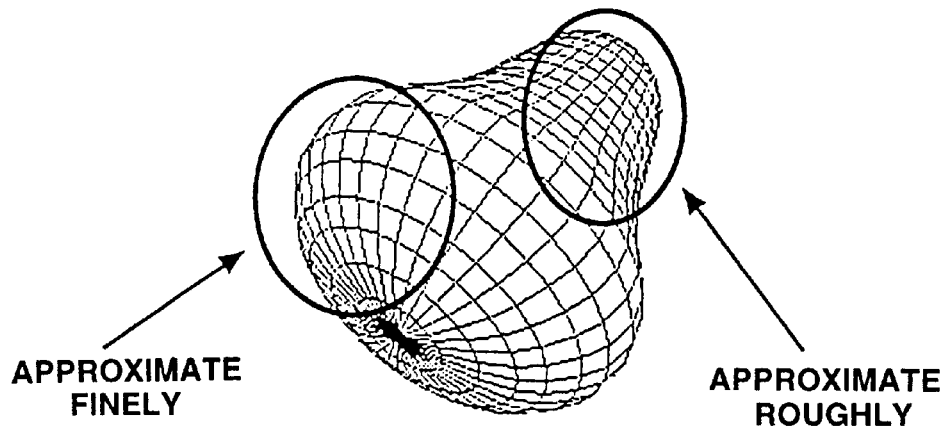
FIG.2A
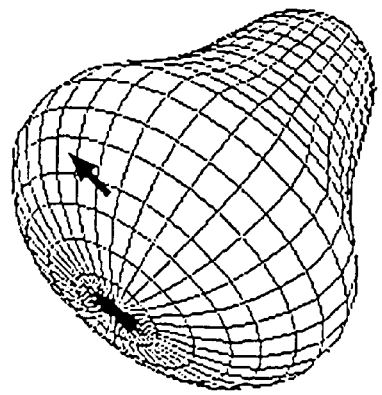
FIG.2B
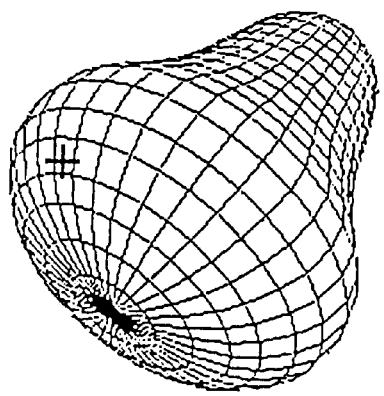
FIG.2C
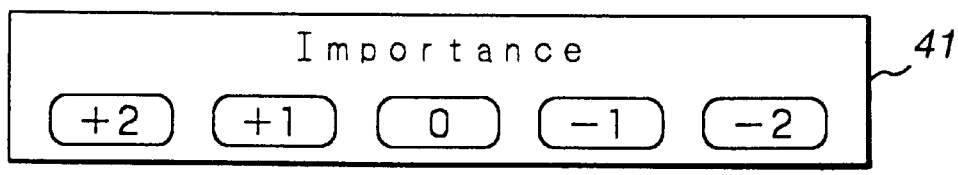
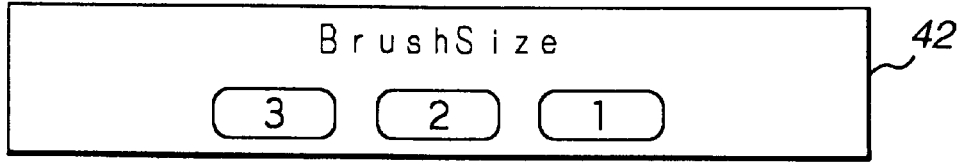
FIG.3

BEFORE EDGE REMOVAL

EDGE REMOVAL

AFTER EDGE REMOVAL

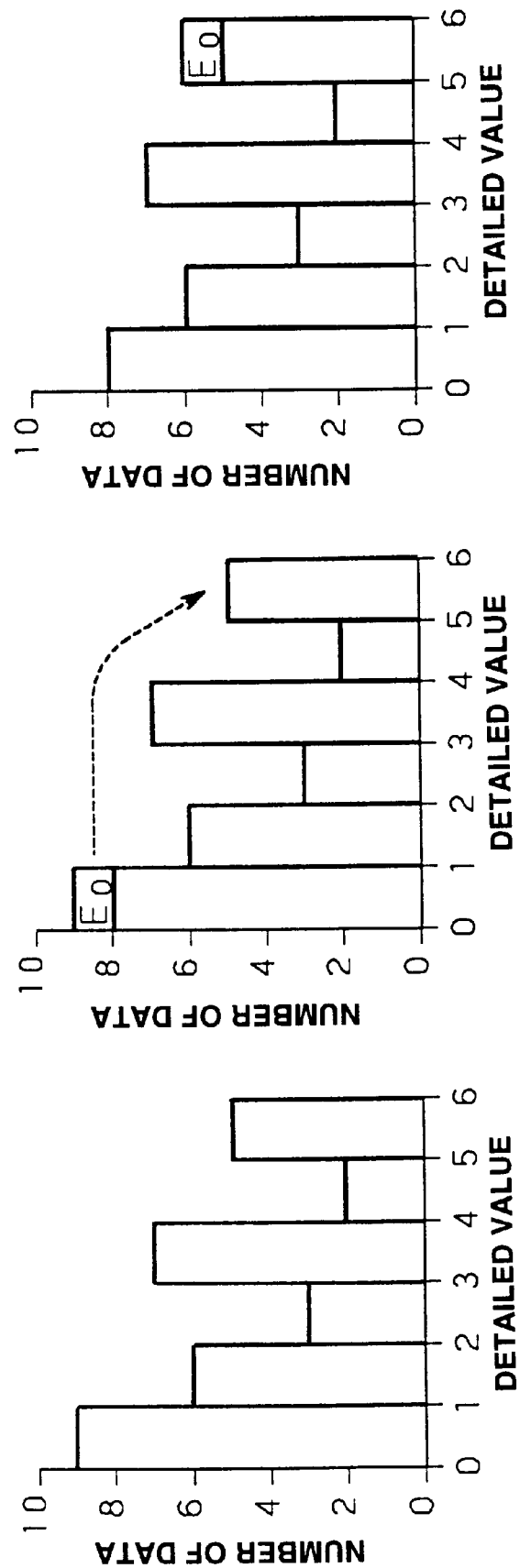

METHOD OF DIVISIONAL
BONDING OF
PRE-APPROXIMATION
PICTURE DATA

METHOD OF DIVISIONAL
BONDING OF
POST-APPROXIMATION
PICTURE DATA

METHOD FOR APPROXIMATING SHAPE DATA, DRAWING APPARATUS AND INFORMATION RECORDING MEDIUM

BACKGROUND OF THE INVENTION

1. Field of the Invention

This invention relates to a method for approximating shape data for diminishing the data volume by approximating a shape model used for computer graphics (CG) while maintaining its global shape. The present invention also relates to a drawing apparatus.

2. Description of Related Art

When drawing a picture by computer graphics (CG), the usual practice is to draw the picture using the same model at all times without regard to the position, size or depth of the model, a particular point viewed by the viewer or the moving speed of the model. This shape model, termed a polygon model, is made up of plural planes.

However, the same model is not necessarily needed for picture drawing. Conversely, plural models can be switched depending on the position, size or depth of the model, a particular point viewed by the viewer or the moving speed of the model, while not only a detailed model of the original but also a more simplified model can be used for drawing for realizing a sufficient picture quality.

That is, the picture quality substantially unchanged from the picture drawn using the same model can be realized by laying plural models having different degrees of fineness in store and by switching between these models during drawing. Moreover, since the CG drawing time depends on the data volume, high-speed drawing becomes possible using models having smaller data volumes than that of the original model. By drawing the picture in this manner, the two requirements for CG drawing, namely high-speed drawing and drawing to high picture quality, can be met simultaneously.

The technique of fabricating models of different degrees of fineness is useful for displaying CG models. However, if the data volume is simply curtailed in lowering the degree of model fineness, the viewer has an alien feeling when viewing the approximated model. For possibly evading the alien feeling, it is desirable to leave global features of the model intact and to curtail the remaining portions for diminishing the data volume. This model approximation has hitherto been carried out by the manual operations by the designer with much time and labor.

In shape approximation, attempts are made in "Re-Tiling Polygonal Surface" by Greg Turk (Computer Graphics, vol.26, No.2, July 1992) to array points as on the polygon surface and to interconnect these points to reconstruct a model for hierarchically approximating the model. The algorithm disclosed in the reference material, while applicable to a rounded shape, cannot be satisfactorily applied to an angular shape, such that it is not intended for general shape. Moreover, there is no reference made in this reference material to partial approximation of a model. In Francis J. M. Schmitt, Brian A. Barsky and Wen-Hui Decoding unit, "An Adaptive Subdivision Method for Surface-Fitting from Sampled Data" (Computer Graphics Vol.20, No.4, August 1986), a Bezier patch is affixed to a three-dimensional shape for shape approximation. However, this reference material is not directed to polygons in general such as those used in CG. In Hugues Hoppe, "Mesh Optimization" (Computer Graphics Proceedings, Annual Conference Series, SIGGRAPH 1993), the energy is introduced in evaluating the approximation models and edge removal, patch division and edge swapping are repeated for minimizing the energy for approximating the model. However, the technique disclosed in this reference material is in need of voluminous repetitive calculations until finding the minimum energy point. Moreover, solution techniques, such as simulated annealing, are required as the other energy minimization problems for evading local minimum points. There is also no guarantee that the minimum energy point necessarily corresponds to the visually optimum point. There is also no reference made to processing for preferentially or non-preferentially approximating certain portions of the model or to processing for clarifying the relation of cause and effect between the model used as an object of approximation and the results of approximation. Thus, past researches suffered from defects in connection with model approximation.

That is, technique of controlling partial degree of fineness according to user designation at the time of shape approximation is not used. Moreover, the relation of cause and effect between the shape model used for approximation and the results of approximation is not shown clearly. In addition, if picture data is affixed to the shape model used for approximation, there has lacked means for ascertaining changes in the picture data affixing manner as a result of approximation.

SUMMARY OF THE INVENTION

It is therefore an object of the present invention to provide a shape data approximating method and a drawing apparatus whereby the user can designate an optional portion of a shape model used for CG for varying the degree of fineness at the time of shape model approximation.

In one aspect, the present invention provides a method for approximation of shape data for approximating the shape data to desired fineness degree including the steps of designating the information concerning the degree of fineness of approximation for a desired portion of shape data and hierarchically approximating the designated portion of the shape data using the designated information concerning the degree of fineness of approximation.

In another aspect, the present invention provides a drawing apparatus for approximating shape data to a desired degree of fineness including edge removal decision means for determining which edge of the shape data is to be removed for approximation, designating means for designating the information concerning the degree of fineness of approximation for an optional desired portion of the shape data and shape approximation controlling means for hierarchically approximating the shape data using the designated information on the degree of fineness for the designate d portion of the shape data.

In yet another aspect, the present invention provides an information recording medium having stored therein the approximating processing of shape data approximating the shape data to a desired degree of fineness, wherein a step of designating the information concerning the degree of fineness of approximation for a desired portion of shape data and a step of hierarchically approximating the designated portion of the shape data using the designated information concerning the degree of fineness of approximation are stored.

BRIEF DESCRIPTION OF THE DRAWINGS

FIGS. 2A, 2B and 2C illustrate designation of partial fineness in approximation.

FIG. 3 illustrates a specified example of inputting of the degree of fineness and the inputting of the range of designation.

FIGS. 9A, 9B and 9C illustrate edge histogram operations.

DESCRIPTION OF PREFERRED EMBODIMENTS

Figure 1:
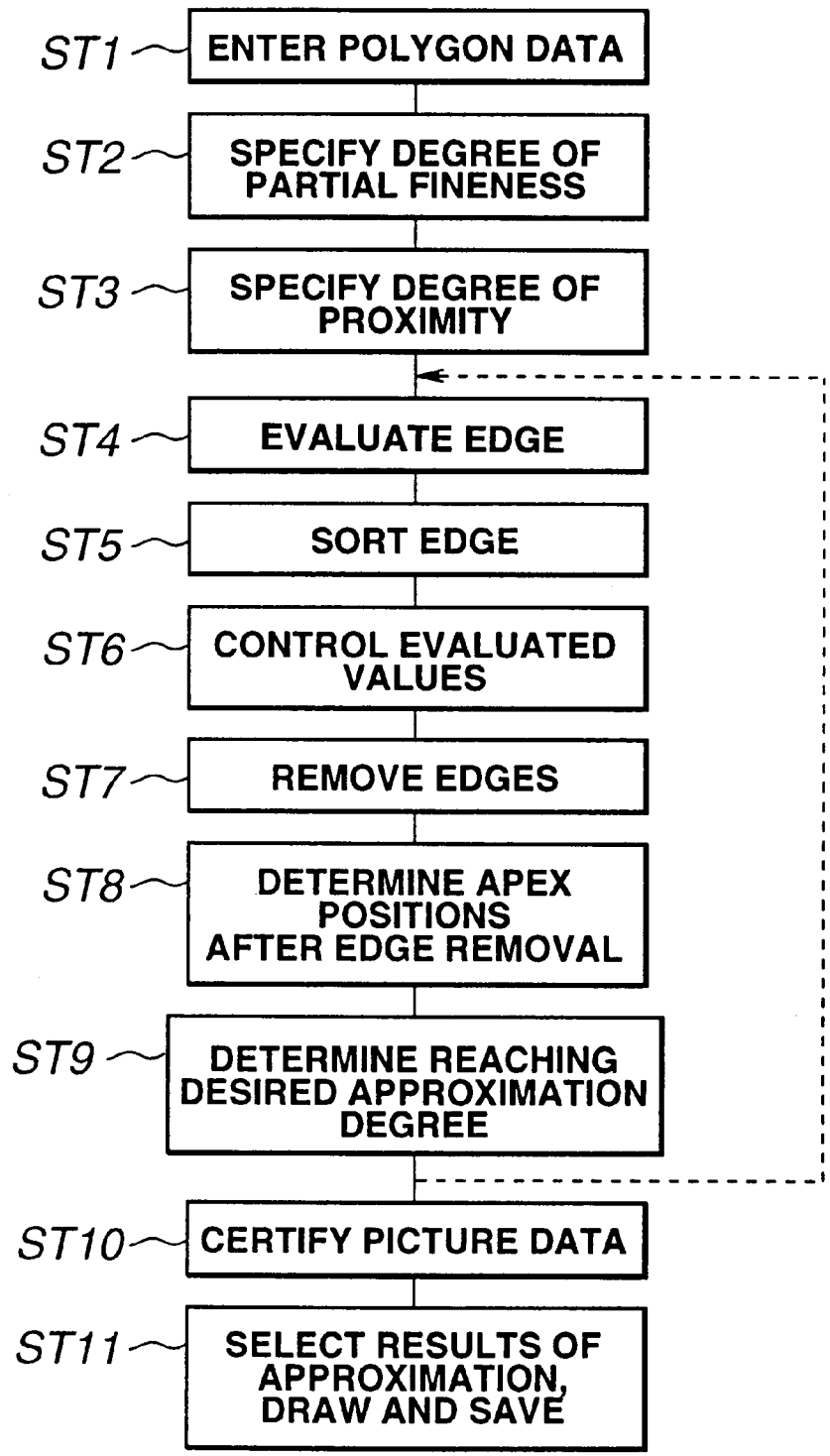
FIG. 1 is a flowchart for illustrating the entire processing carried out in accordance with the present invention.

Referring to the drawings, preferred embodiments of the shape data approximating method and apparatus according to the present invention will be explained in detail.

FIG. 1 shows a flow chart for illustrating hierarchical approximations of a polygon model embodying the present invention. For approximating a polygon, edges of the polygon are removed and its shape is approximated. The processing for this approximation is explained in accordance with the sequence of steps ST1 to ST11 of FIG. 1.

In FIG. 1, original polygon data are entered at step ST1. At step ST2, the user designates partial fineness (resolution and definition) of the polygon model. At step ST3, the extent of model approximation, that is to which extent the model is to be approximated, is designated. At step ST4, each edge is evaluated for edge removal. At step ST5, the evaluated values are sorted according to their sizes. At step ST6, the evaluated values are controlled responsive to designation of the degree of partial approximation by the user. At step ST7, the edge having the smallest evacuated value is selected and removed. At step ST8, the positions of the apex points left after edge removal are set. At step ST9, it is judged whether or not the desired degree of approximation has been reached. If picture data are affixed to the model, the manner of picture data affixture to the model for approximation is displayed or saved at step ST10, subject to designation by the user, based on the results of approximation. At step ST11, the approximated model is selected from plural hierarchies and drawn or saved. The processing from step ST4 up to step ST9 is carried out repeatedly in meeting with the desired degree of approximation.

In the above processing, the operations at steps ST2, ST3, ST6, ST9 and ST10, which are crucial in the present embodiment, are explained in detail.

First, at step ST1, the polygon data for approximation are entered. Then, at step ST2, not only is the model uniformly approximated on the whole, but also it is partially particularized or roughed by way of designating the partial degree of fineness.

That is, at step ST2, not only is the model uniformly approximated, but also an optional portion of the model is roughed by more aggressive approximation for roughing the model portion than other portions, or is left unapproximated for leaving details, by way of designation of partial difference in fineness by the user.

In approximating a shape model, evaluated values of the edges making up the model are calculated, edge crucialness is measured by the relative magnitudes of the evaluated values and the edges are removed in the order of decreasing values of evaluation for approximating the model. If the evaluated values of the edges of the entire model are simply calculated for approximation, the result is the approximation over the entire model. In case of a polygon model made up of plural larger or smaller triangles, the result of approximation is made up of surfaces of generally uniform areas. However, the user approximating a model has the desire to leave certain portions unapproximated, that is in a detailed state, or to roughly approximate certain portions. The processing for the user to designate the partial degree of fineness for approximating different model portions roughly or finely is the processing carried out at step ST2.

FIG. 2 shows an example of the method for designation. Assume that, in FIG. 2A, the user intends to approximate an area of a model shown by a left-side circle in a detailed state while roughly approximating another model area indicated by a right-side circle. To this end, the user designates an optional area of the model for approximation to the degree of fineness desired by the user. For this designation, optional areas of the model are designated, using arrows or xmarks, for designating surfaces, sides or apex points, as shown in FIGS. 2B and 2C. Instead of designating the picture portions, numerical values specifying elements making up the model, such as surfaces, sides or apex points, may be entered for designation. Instead of indicating model portions on a screen, an area included in a frame specified on a screen may be designated in its entirety.

For further specifying the degree of fineness, the desired degree of fineness is selected within a range of from +2 to −2 of each selection button in an area 41 displayed as 'Importance' in FIG. 3. Here, +2 denotes the portion desired to be left in a detailed state, whilst +1 denotes a portion desired to be left in relatively detailed state. On the other hand, '0' denotes absence of designation on the degree of fineness, while '−1' and '−2' denote a portion desired to be left in the least detailed, that is most roughed, state and a portion desired to be left in a relatively roughed state. The above range from +2 to −2 may be broadened or narrowed, if so desired. The figures from +2 to −2 are for guidance only and represent numerical figures specifying the numbers for weighting to be attached to the degree of fineness as compared to a case of not specifying the degree of fineness. Thus, these numerical figures may be attached to the model or used simply as indices. As for designation of the degree of fineness, the degree of fineness of the original model may be left undesignated without attempting approximation instead of designating the fineness or roughness.

When designating areas as shown in FIG. 2, not only the area specified by the user but also neighboring portions may also be specified simultaneously for eliminating the necessity of specifying the degree of fineness for these neighboring portions for thereby saving the labor for the user. The enlarging number may be selected by selection buttons 1 to 3 in a display area 42 of a 'brush size' shown at a lower portion of FIG. 3. That is, if, in designating an area, the 'brush size' is selected, not only the designated area but also a broader area can be thereby designated. As compared to the case of the 'brush size' of 1, the brush size 2 or 3 denotes a sequentially broader area in this order. The numerical figures of 1 to 3 are similarly used as indices for specifying the extent of enlargement beyond the range designated by the numerical figures in 'Importance'.

Figure 4A:
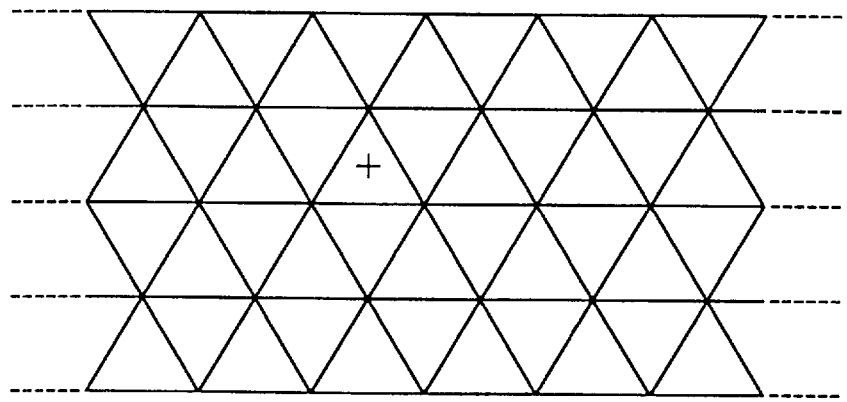
FIGS. 4A, 4B and 4C illustrate specified examples of areal designation.
Figure 4B:
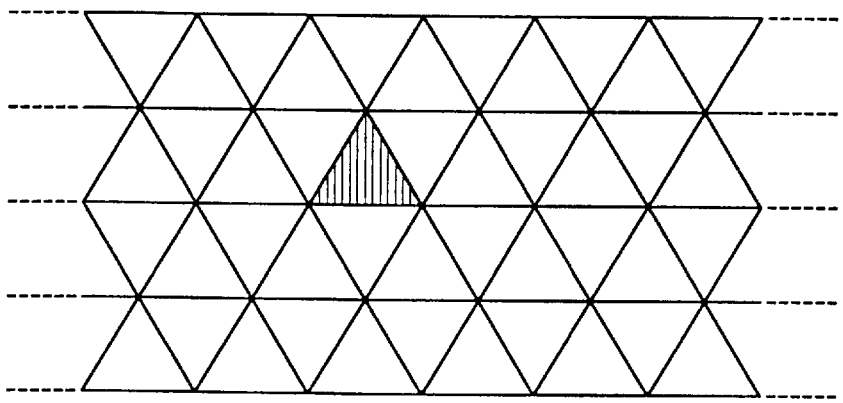
Figure 4C:
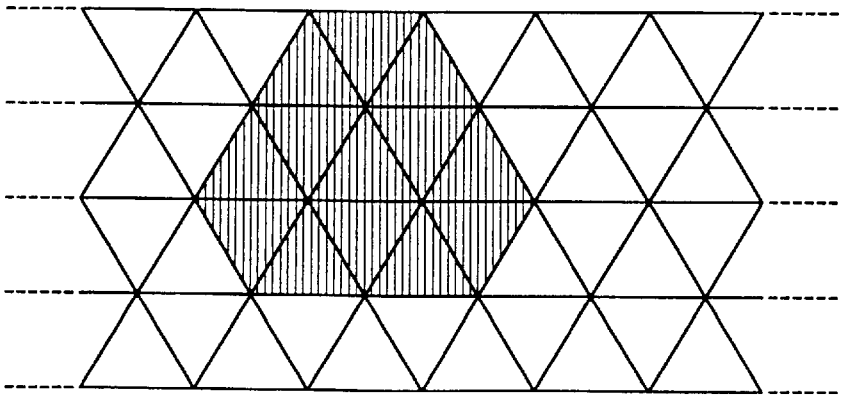

By way of illustrating a specified example of designating an areal broadness, if a surface is indicated by + as shown in FIG. 4A, only the area designated by + is designated in FIG. 4B, whereas plural surfaces inclusive of apex points of the surface of FIG. 4B are designated. If, in designating a surface, an ambient area is designated simultaneously, there is no necessity of designating neighboring portions by separate designating operations. Although three sizes of from 1 to 3 are specified in FIG. 3, smaller or larger sizes may also be used. Instead of using integer numbers, such as 1 to 3, fractional numbers or alphabetical letters, such as a or b, capable of distinguishing difference in size, may also be used.

The designation explained above with reference to FIG. 3 preferably can be rescinded by the user. For example, designation of the degree of fineness of broadness can easily be cancelled by setting, for example, an 'undo' designating button. If overwriting is possible, correction can be made easily. If all designations can be cancelled, the state directly after the processing of step ST1 can be restored.

After designating the degree of partial fineness, the designated area may be varied in color or brightness for indicating that the designation remains valid. If, for example, the areas designated with +2, +1, −2 or −1 are colored in red, orange, blue or pale blue, the degrees of fineness can be visualized easily. Moreover, if the area left in detailed state and the area to be roughed are colored in warm or cold colors, respectively, as in the above case, the designation can globally be comprehended, even although the specified degree of fineness cannot be understood precisely.

At step ST3, the user designates the degree of approximation for the shape model in its entirety.

Figure 5:
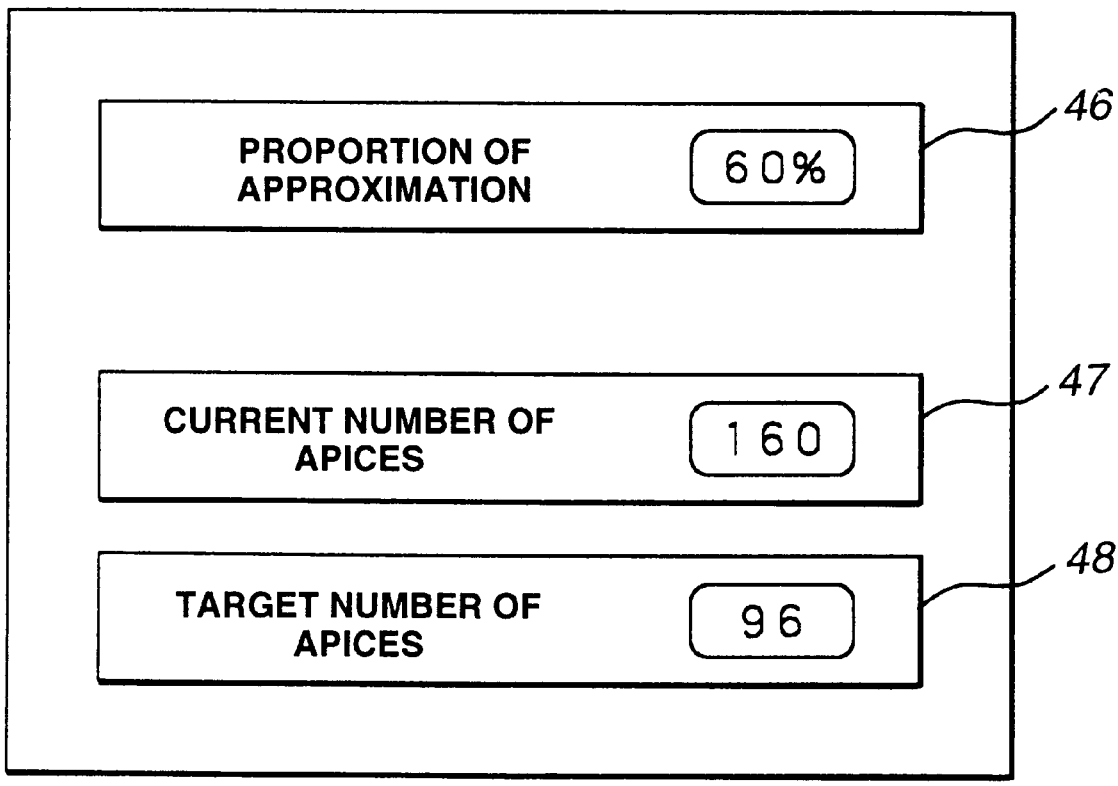
FIG. 5 illustrates a specified example for designating the desired degree of approximation.

FIG. 5 shows an example of the designating method. The contents shown in FIG. 5 are displayed on a screen of a device executing the approximation. FIG. 5 shows an approximation proportion area 46, an area for the number of current apex points 47 and an area for the target number of apex points 48. The approximation proportion of the area 46 denotes the proportion of approximation with respect to a shape model (original model) used for approximation. For example, this proportion specifies the percentage of the number of apex points in the approximation model with respect to the number of apex points of the original model. Although the number of the apex points is taken as an example, any other numbers specifying the shape model, such as the number of sides, number of pictures, number of textures or number of normal lines, may be used for specifying this proportion. The current number of the apex points of the area 47 is the number of the apex points of the shape model used for approximation. The target number of the apex points of an area 48 specifies the number of apex points of the model resulting from approximation. In FIG. 5, the proportion of approximation is 60%, and the current number of the apex points is 160, so that the target number of the apex points is 96. If the shape model used for approximation is set, the number of apex points is readily apparent, so that, if the proportion for approximation is pre-set, the target number of the apex points is automatically set by application of the pre-set proportion of approximation. By so doing, the user is not in need of re-calculating the number of target points for entering a newly calculated number. Also, the ratio of approximation relative to the original can also be known readily.

Conversely, if the user has changed the target number of apex points, the user can know the ratio of approximation of the target number of the apex points relative to the original as set, without having to make calculations. If two items other than the current number of target points, namely the proportion of approximation and the number of target apex points, are set so as to be changed at an optional time by the user, the proportion of approximation and the number of target apex points, once set, can be changed in a desired manner by the user. Although the number of apex points is used as an index, the number of surfaces representing a shape model, the number of edges, the number of textures or the number of normal lines may also be used as indices. The proportion of approximation can be pre-set to a reference value for saving the labor of entering the value each approximation. Moreover, if this numerical value is pre-set, the results of approximation can be obtained as geometrical series on repetition of the approximately operations. That is, each approximation operation gives a series of models having a constant number of surfaces with respect to the original model. The sum of the geometrical series converges to a constant value. For example, in approximation by steps of 60%, the sum total of the number of the surfaces of the model converges to 250% of the value of the original model.

By approximation in the form of geometrical series, the sum total of the data volumes of the models for approximation is converged to a constant value, without divergence, thus reducing the number of memories for storage of models.

This proportion of approximation, once temporarily set, can be modified at any time by the user, if so desired, thus enabling approximation to a desired optimal approximation degree.

Next, edge evaluation at step ST4 is explained.

The polygon approximation is executed by, for example, repeating edge removing operations. For selecting the edges suitable for removal, an evaluation function F(e) for evaluating how an edge of a model contributes to the model shape is introduced. An example of the evaluation function F(e) is given by the following equation (1):

$$F(e) = \sum_i |aVi + bSi| \quad (1)$$

$$Vi = (Ni \cdot E) \times Ai$$

$$Si = |E| \times Ai$$

where a, b are coefficients

Figure 6:
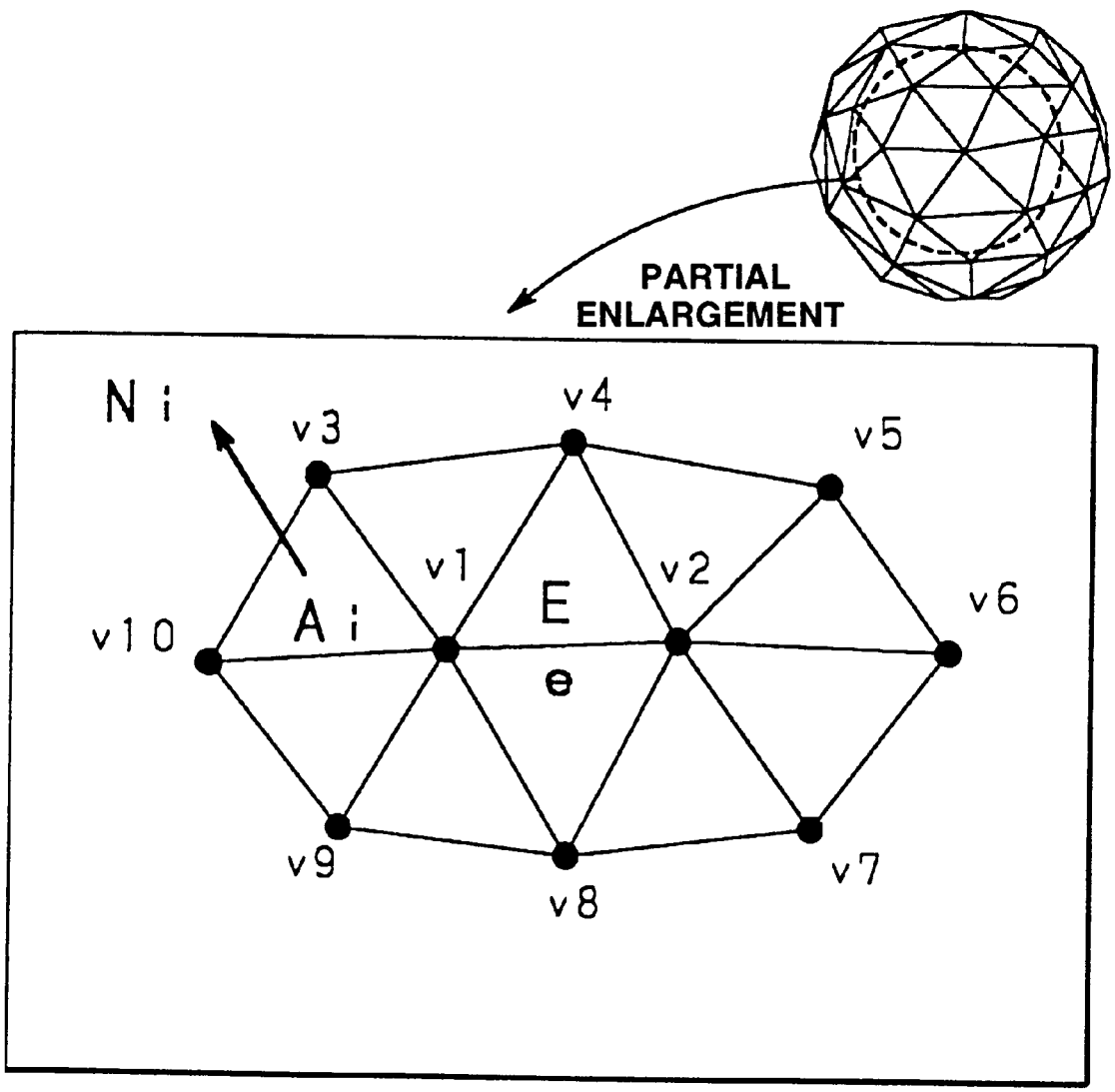
FIG. 6 illustrates edge evaluation in approximation.

In the above equation (1), E, Ni, Ai and v1 to v10 correspond to a vector E, a normal line vector Ni, surface Ai and apex points v1 to v10, respectively, as shown in FIG. 6. In this figure, drawing data are partially enlarged for illustrating the above equation (1).

The evaluation function F(e) of the equation (1) evaluates an edge e made up of two apex points v1 and v2. If a set of planes containing the two apex points v1, v2 making up the edge e (v1, v2) are written as S(v1), S(v2), the range of i becomes S(v1) ∪ S(v2). Also, in the above equation, E, Ni, Ai and |E| denote a vector having a direction and a length of the edge e, a unit normal line vector of each surface, an area of the surface and the length of the vector E, respectively.

The evaluation function F(e) of the equation (1) is made up of two terms, of which the first term Vi is a volume variation on removal of the edge under evaluation. The second term Si is a product of the surface on both sides of an edge under consideration and the length of the edge under consideration. The second term Si is a volume variation of the surface containing only the edge under consideration. The above two terms are multiplied by coefficients a and b the magnitudes of which can be selected by the user depending on which term importance is to be attached to. The first term Vi depends appreciably on the peripheral shape of the edge under evaluation. On the other hand, the second term Si depends on the length of the edge under consideration and on the area of the surface on both sides of the edge under consideration. If the model is flat in shape, as a paper sheet, the variation of Si is larger than that of Vi. In a model all surfaces of which are made up by the surfaces of similar shape and area, the variation due to the term Vi becomes larger than that due to the term Si.

If the value of the equation (1) is found for each edge constituting a figure model and the resulting calculated values are sorted in the order of the decreasing magnitudes for selecting the edge of the smallest evaluated value, this edge is the edge contributing to the model shape on edge removal to the least extent. The processing for approximating the model shape is carried out by the steps ST4, ST5 and ST7.

Figure 7A:
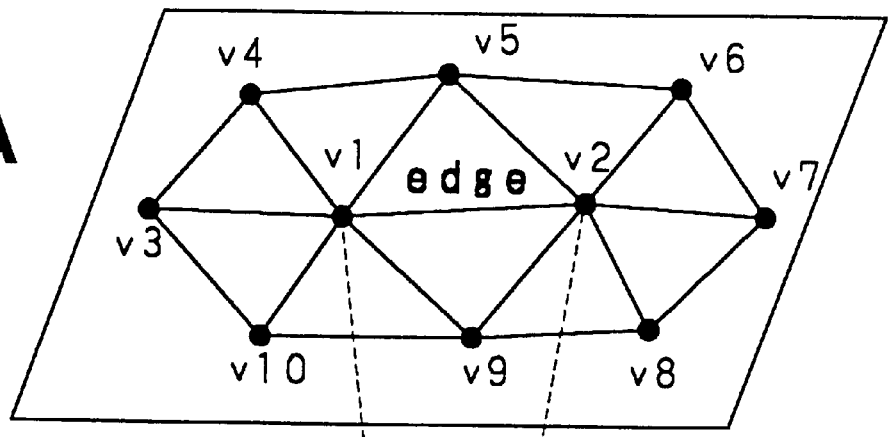
FIGS. 7A and 7B illustrate an edge-removing operation.
Figure 7B:
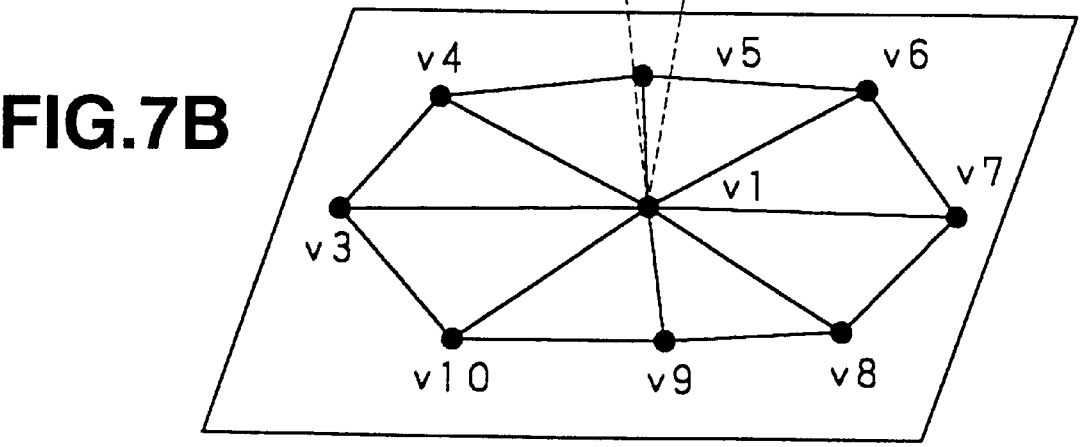

FIGS. 7A and 7B show an example of edge removal. Specifically, FIGS. 7A and 7B show the state before edge removal and that after edge removal, respectively. With edge removal, the apex point v2 is removed, while the apex point v1 is left. Although the apex point v1 can be left at its position prior to edge removal, the apex point v1 is preferably moved to a position minimizing the shape changes subsequent to edge removal since then the approximated model is improved in quality.

In the example of FIGS. 7A, and 7B the approximated model is improved in quality by moving the apex point v1 (see FIG. 7B) to a position intermediate between the apex point v1 and the apex point v2 (see FIG. 7A). In this manner, the apex point after edge removal is determined at step ST5. In determining the apex point position, the position of the apex point intermediate between two apex points constituting an edge being removed is calculated as a coefficient which is outputted, as shown in FIGS. 8A to 8C.

Figure 8A:
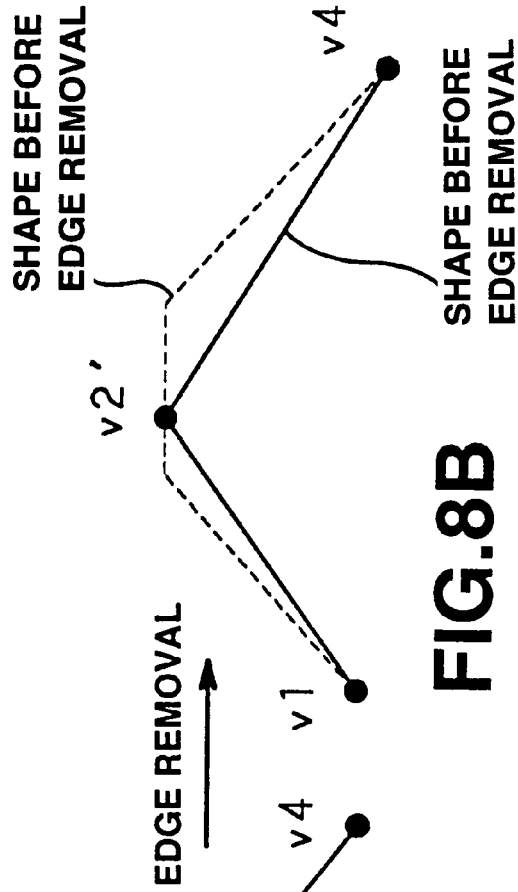
FIGS. 8A, 8B and 8C illustrate apex point position decision after edge removal.
Figure 8B:
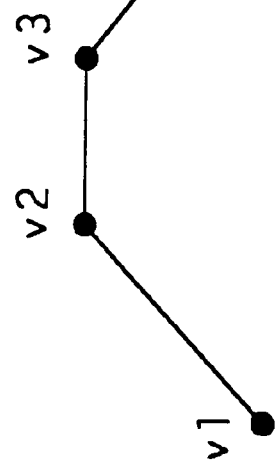
Figure 8C:
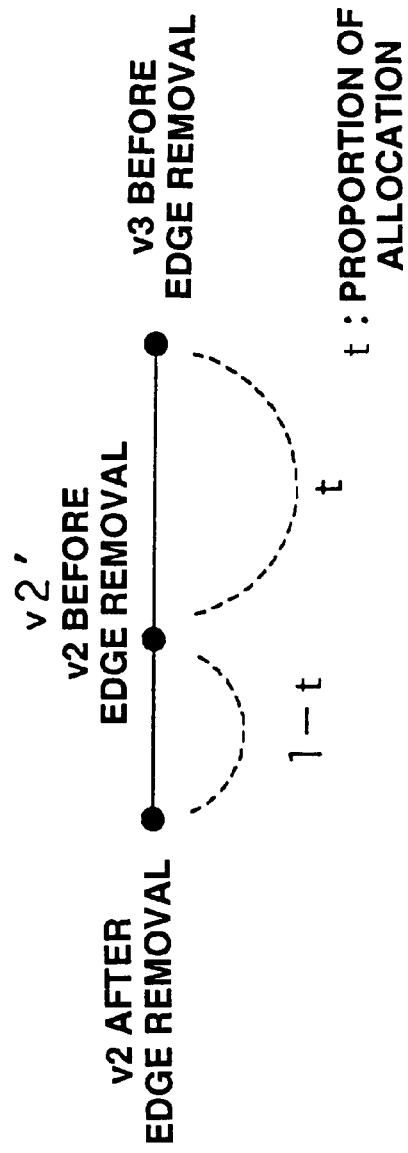
Figure 10A:
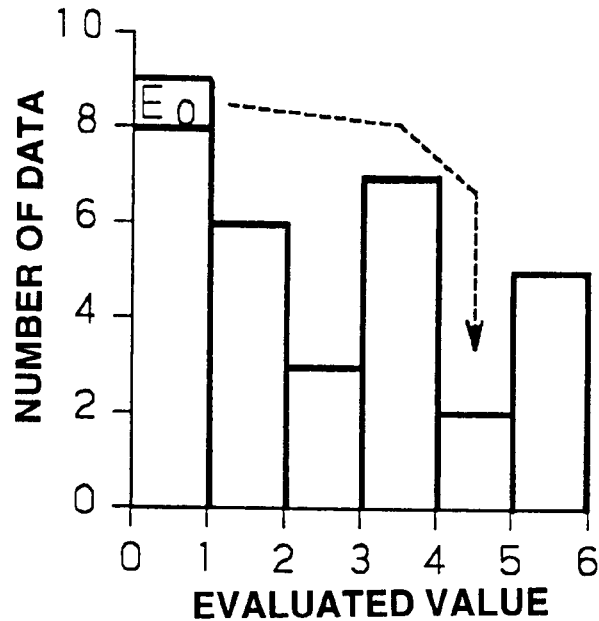
FIGS. 10A and 10B illustrate other edge histogram operations
Figure 10B:
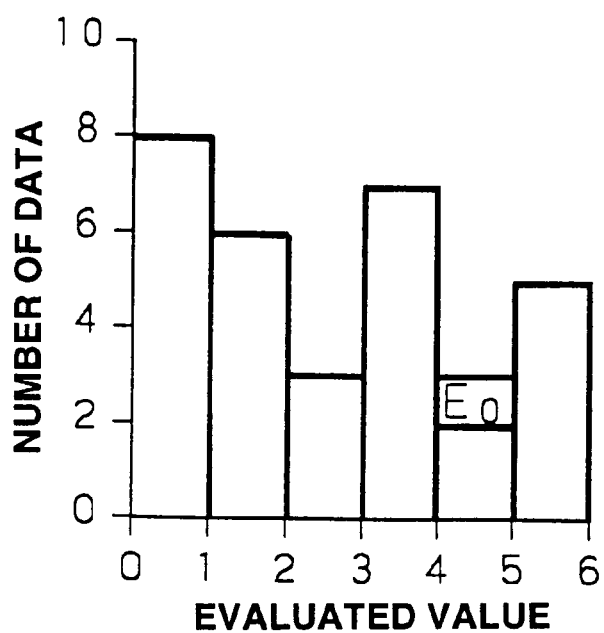

In FIG. 8, an edge defined by two apex points v2 and v3 is removed, as show in FIGS. 8A and 8B. After edge removal, the two apex points v2 and v3 are integrated to v2 which is identified as v2' for convenience. The position of v2' is found by linear interpolation between v2 and v3, with the proportion being t:1−t as shown in FIG. 8C. The coefficient of distribution t may be set depending on the magnitude of the edge evaluation value, or fixed at 0.5 so that the apex point is at the center between the edges. Alternatively, it may be set to a fixed value other than 0.5 such that the apex point is set at a pre-set position between the edges.

As described above, the evaluation function of the equation (1) means the sum of two items, namely the item of the volume variation and areal variation after edge removal. These variations may be multiplied by coefficients a and b for varying the weights of the two terms. If the evaluation function is designated to different degree of fineness, the partial degree of fineness designated at step ST2 can be calculated by varying the weight or the value can be acted upon after calculations for realizing a model changed in its partial degree of fineness.

At step ST5, the evaluated values of the edges evaluated at step ST4 are sorted by a quick sorting method or a heap sorting method which are well-known techniques in data processing. These techniques are disclosed in publications and hence are not specifically explained herein.

At step ST6, the evaluated values are controlled for performing model approximation with partially varied fineness degree in case the user has designated the degree of fineness at step ST2. The model approximation is executed by repeating edge removal operations. In this case, edges are removed in the order of increasing edge evaluation values. Thus, the portion of the entire model having a larger edge evaluation value is left in a particularized state without being removed. Conversely, an edge of a portion desired to be left in the rough state is preferentially removed if the edge evaluation value is of the small value in the entire model. Thus, the portion remains in a roughed state. This permits partial control of the degree of fineness in model approximation, as will be explained taking an example of FIG. 9.

At step ST4, a histogram of edge evaluation values is calculated for all edges of the model and drawn in a histogram of FIG. 9A, in which the abscissa stands for the evaluated edge values and the ordinate stands for the number of edges of the evaluated values. With the evaluation value E, there are nine edges for which E is such that $0 \leq E < 1$. Assume that the evaluated value of a given edge is 0.5. Since the edge evaluation value of the edge E0 is of a smaller value among the evaluated values of the entire model, the edge E0 is highly likely to be removed at an earlier time point if edge removal is repeated for model approximation. However, if the user designates the edge E0 at step ST2 so that the edge E0 shall be left in the most particularized state, it is necessary not to remove the edge E0 but to leave the edge E0 in the particularized state. If the evaluated value of the edge E0 is increased so that the evaluated value will be of a larger value in the sequence of the edge evaluation values of the entire model, the edge E0 is not removed. For example, if the evaluated value of the edge E0 is in a range from 5 to 6, the edge evaluation value is of a larger value in the entire model, as shown in FIG. 9C. If the edge evaluation value is extremely large among the evaluation values of the entire model, it is preferentially removed during mode approximation if the edge evaluation value is multiplied by a coefficient smaller than 1 for reducing its value. Thus, by calculating the evaluated values of the edge constituting a shape model, finding its distribution and exploiting the operation of distribution, the partial degree of fineness can be changed during approximation of the shape model.

In the example of FIG. 9, the edge evaluation values are classified in six stages and the evaluated values of the edges are multiplied by coefficients for acting on the distribution of the edge evaluated values. The number of distribution can be increased or decreased in meeting with the stage of designation of the degree of fineness. Although the evaluated values of the edge E0 are acted on so as to be shifted from the smallest value side towards the largest value side in the classification, the edge evaluation value can be operated not only to the maximum class but also to an optional class by controlling the magnitude of the coefficient multiplied to the edge evaluation value.

Although the control employing a histogram of evaluated values has been explained above, there are other techniques employing the order of evaluated values.

Figures 11A, 11B, 11C, 11D:
FIGS. 11A, 11B, 11C and 11D illustrate an order-setting operation for edge evaluation values.

Assume that a model is made up of 10 edges. FIG. 11A shows the evaluated values of the edges in the order of the increasing evaluation values.

Since the edge removal begins from the edge with the least evaluated value, the edge removed first is an edge with an evaluated value of 0.2. if the user intends to leave this edge until the last stage of approximation, it suffices to operate to shift the edge to the largest value position in the sequence. The result of this operation is shown in FIG. 11C in which the edge with the evaluation value of 0.2 is left after execution of the edge removal. There is also such a technique in which not only the position in the sequence is shifted but the evaluated value itself is multiplied by a coefficient such that the evaluated value is changed in its magnitude to change the position of the evaluated value in the sequence, as shown in FIG. 11D. Here, the initial evaluated value of 0.2 is multiplied by or added to a certain coefficient for changing the evaluated value to 1.8. This gives the maximum value so that the value is maximum in the sequence. The result is that the edge can be left in the model.

There is also such a technique in which not only is the edge maximized in value in the sequence but also the edge may be arrayed at a certain order of magnitude from the maximum value or at a certain order of magnitudes from the minimum value.

Although the approximation control has been explained in connection with the order of magnitudes in the sequence, there is also such a technique in which the proportion in the sequence is operated. If, for example, there is a edge to be left, the edge is not removed but left if the evaluated value of the edge is changed to a point within 10% from the maximum value in the sequence. The figure of 10% is not fixed but may be acted upon by designation by the user. Although the evaluated value itself can be changed, only the order of magnitude in the sequence can be changed without changing the evaluation value itself, as shown in FIG. 11C.

Figure 12:
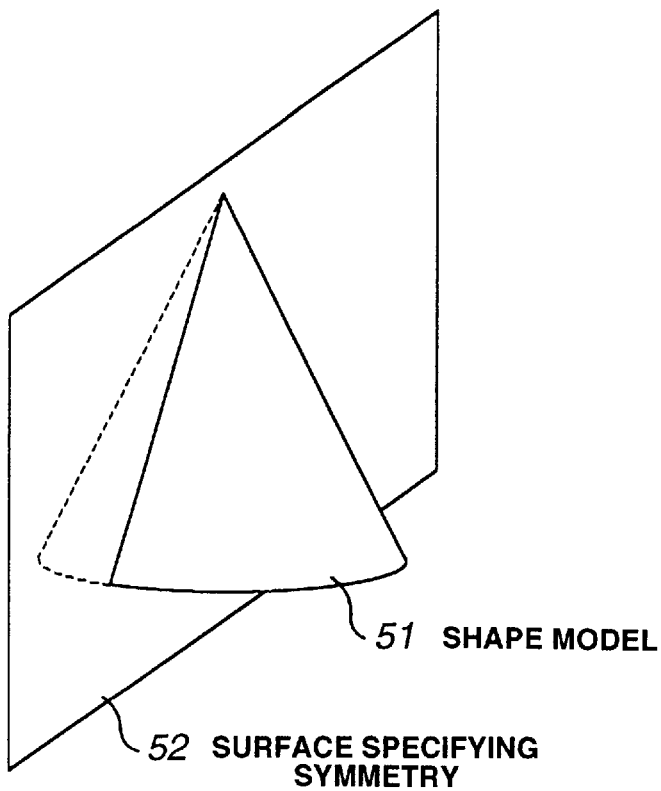
FIG. 12 illustrates symmetry designation of a shape model.
Figure 13:
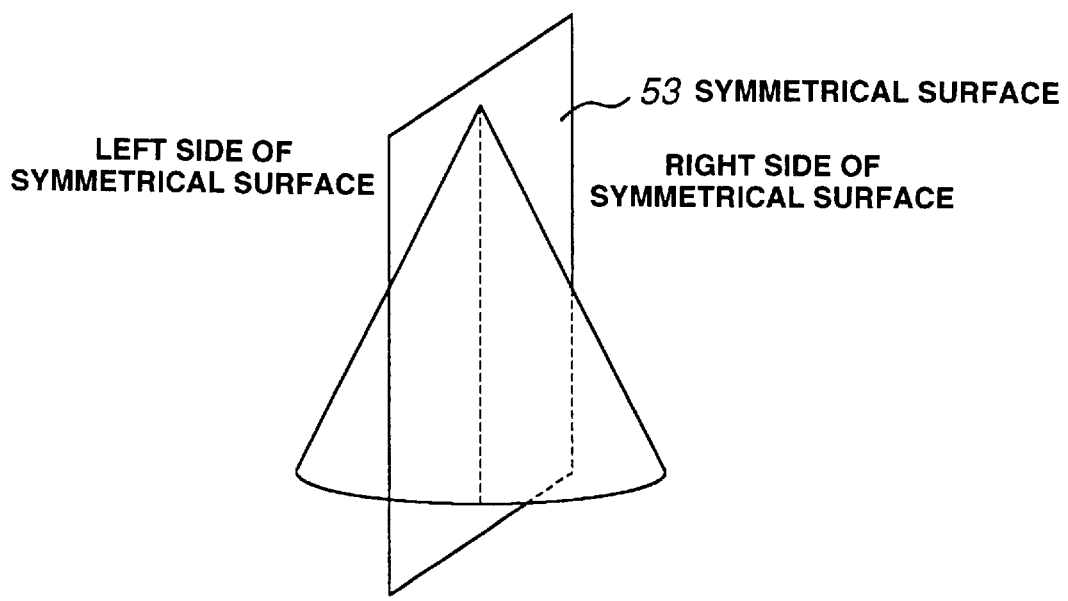
FIG. 13 illustrates the sequence of edged to be removed after symmetry designation.

At step ST7, an edge with the minimum evaluated value is removed for model approximation. By edge removal, the edge constituting the model is extinguished, so that the surface or apex point pertaining to the edge disappears. The edge removing operation may be realized not only by simply removing the edge with the least evaluated value but also by controlling the order of removal thereby controlling the result of approximation. There are occasions wherein a shape model is symmetrical with respect to a given surface, line or a point such that the user who approximates the shape model desires to maintain the symmetry of the shape model in the results of approximation. In such case, the user enters the fact that the shape model being approximated is symmetrical with respect to a surface 52, a line or a point, as shown in FIG. 12. The example of FIG. 12 shows a shape model 51 symmetrical with respect to the surface 52. After designation of symmetry of the shape model, the edge removal is controlled on the basis of the index of symmetry (designation by surface, line or point). If the surface 53 is designated, as shown in FIG. 13, and an edge lying on the right side of the surface of symmetry is removed, the edge lying on the left side of the surface is removed at the next edge removing step for maintaining model symmetry. Similar processing may be carried out for other cases (lines or points) for which symmetry is designated as described above.

At step ST8, the apex points accompanying edge removal are set.

That is, if an edge is removed from the model, the surface pertaining to the edge removed and the apex point making up the edge are also removed. By adjusting the apex points left after edge removal, shape changes in the approximated model can be decreased to improve the model quality. This processing is carried out at step ST8.

At step ST9, it is judged whether or not the results of approximation have reached the degree of approximation as set at step ST3. If the result of judgment is negative, the operations from step ST4 to ST8 are repeated and, if otherwise, the looped operation is terminated to proceed to the next step.

At step ST10, if the pictured data is affixed to the shape model, the corresponding operation is carried out. If the user finds this step ST10 unnecessary, this processing is not carried out and processing transfers to the next step.

Meanwhile, in computer graphics (CG), a technique known as texture mapping, in which picture data is affixed to a model for improving the apparent quality of the drawn model, is used, as shown for example in FIG. 14.

Figure 14A:
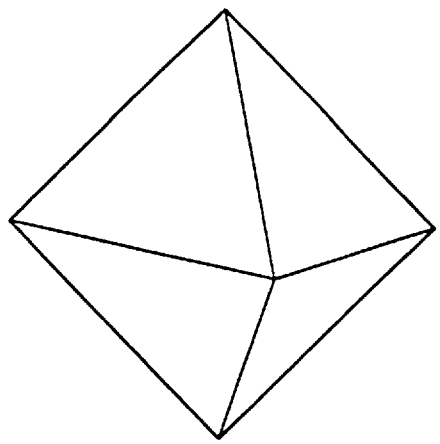
FIGS. 14A, 14B and 14C illustrate picture data splitting in case of affixing picture data to the shape model.
Figure 14B:
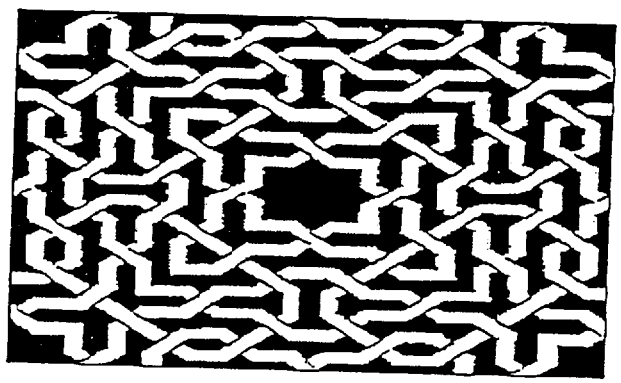
Figure 14C:
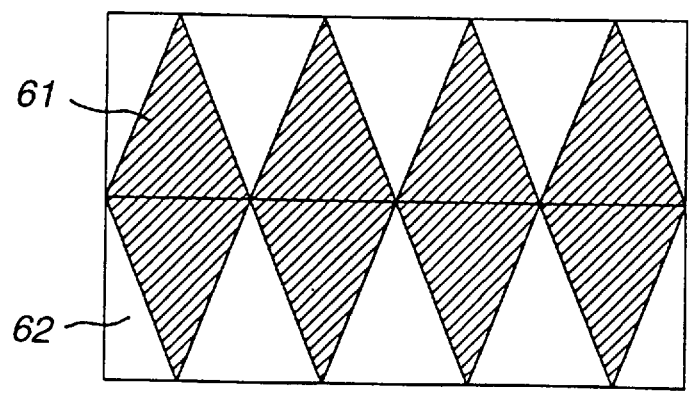

FIG. 14A shows a shape model being drawn. The shape model herein is octahedral in shape. FIG. 14B shows picture data affixed to the shape model. The picture data affixed to the shape model is two-dimensional data. In this texture mapping, it is designated which picture of the picture data is affixed to which surface of the shape model. That is, the picture data is split into smaller size pictures and the resulting picture areas are affixed to the surfaces of the shape model. FIG. 14C shows an example in which picture data is split for affixture to the shape model of FIG. 14A. In FIG. 14C, a shaded area 61 denotes a portion affixed to the shape data, while the remaining area is a portion not affixed to the shape data.

Figure 15A:
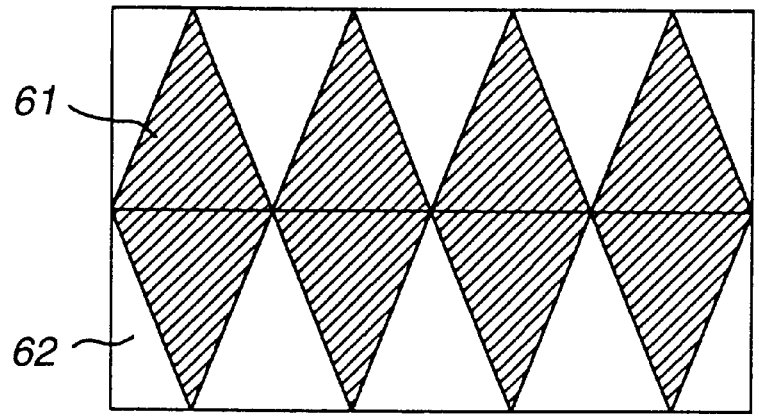
FIGS. 15A and 15B illustrate variations in picture data splitting by shape model approximation.
Figure 15B:
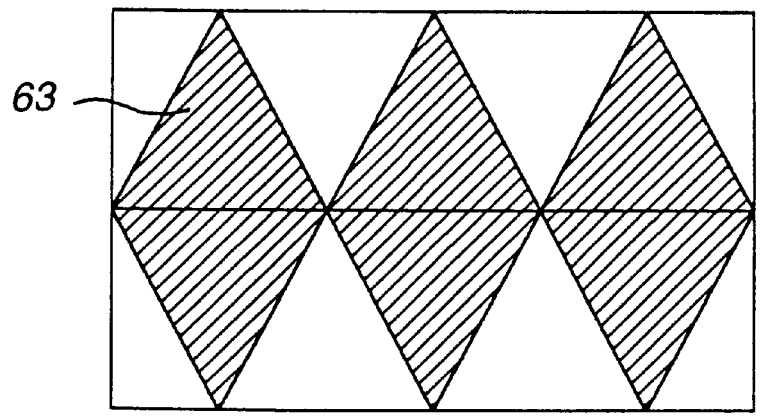

In which shape the picture data is to be split and affixed affects the quality of the drawn picture in case texture mapping is used, such that the user preparing a CG picture needs to pay attention to the splitting method. If texture mapping is used in case the shape data shown in FIG. 14A is approximated to provide a hexahedral shape, it is necessary to split the picture data as prior to approximation and to affix the split picture data to the approximated shape data. If the octahedral body of FIG. 14A is approximated to result in a hexahedral body, the edges are removed by approximation such that the number of surfaces is decreased. Therefore, the splitting in case of affixing the same picture data is changed from an area 61 shown in FIG. 15A to an area 63 shown in FIG. 15B. Although the results of mapping to an approximated model becomes apparent on CG drawing, it is not apparent from the CG drawing how the texture picture data has been split. Therefore, if the manner of representation shown in FIG. 15B is used, the user can easily comprehend the manner in which the picture data has been split.

Although the manner of splitting is indicated in FIG. 15 by surfaces of the shaded portions, the manner of representation employing lines, frames or colored areas may also be used for identifying the split areas. The user can ascertain the picture at any time after approximation if the picture is stored in an optional picture file, such as GIF or JPEG, without simply displaying the picture on the screen. It is also effective to use hard copies or networks for display or saving. The processing from step ST3 to step ST9 as explained above is repeated until desired degree of approximation is reached for approximating the model.

At step ST11, if there are plural models approximated as described above, one of the models having the desired resolution may be selected for drawing or storage.

Figure 16A:
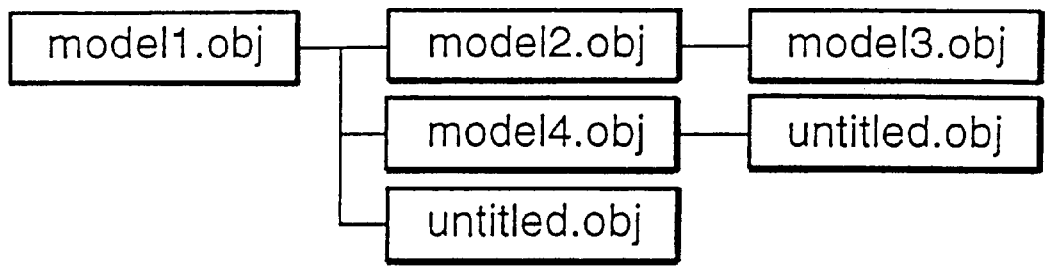
FIGS. 16A, 16B illustrate the relation of cause and effect between the model for approximation and the result of approximation.
Figure 16B:
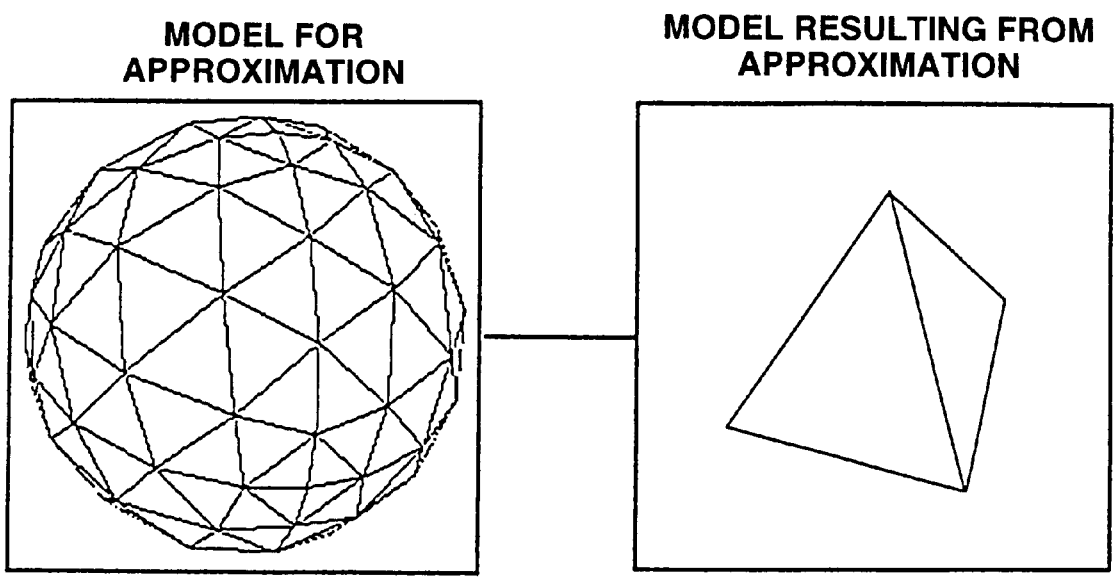

The above processing approximates the shape model to the desired partial fineness degree and desired degree of approximation. Thus, if a model is approximated, and plural approximations have been done with different degrees of approximation, it becomes difficult to grasp the relation of cause and effect of the respective models. However, if the relation of cause and effect of the respective models is specified by the file names accorded to the models and the relation is specified by lines as in the case of a list structure, it can be easily known which model has been acquired from which model. The relation can similarly be grasped by drawing a model by CG and indicating the relation by lines as shown in FIG. 16B. Thus, the relation of cause and effect in the approximation process can be indicated to the user by representing not only the file name or the CG picture but also the shape of representing respective models by lines or positions such as to clarify the relation. If it has become unable to display all the models on a screen, only necessary models can be drawn by designating the frame of each model or file name shown in FIG. 16A and displaying only the designated models. In this case, if only the frame of the model currently displayed is highlighted or changed in color, the user can comprehend which model is being drawn. If the model or file name is not simply displayed on the screen, but is stored in a medium, such as a hard disc, from which it is subsequently read out, the relation of cause and effect may be recorded separately from the model for clarifying the relation. Thus, if the model is approximated and stored, the relation of cause and effect may be known subsequently. The destination of storage may be network or an electronic memory capable of transient or permanent storage in addition to the medium, such as a hard disc.

Figure 17:
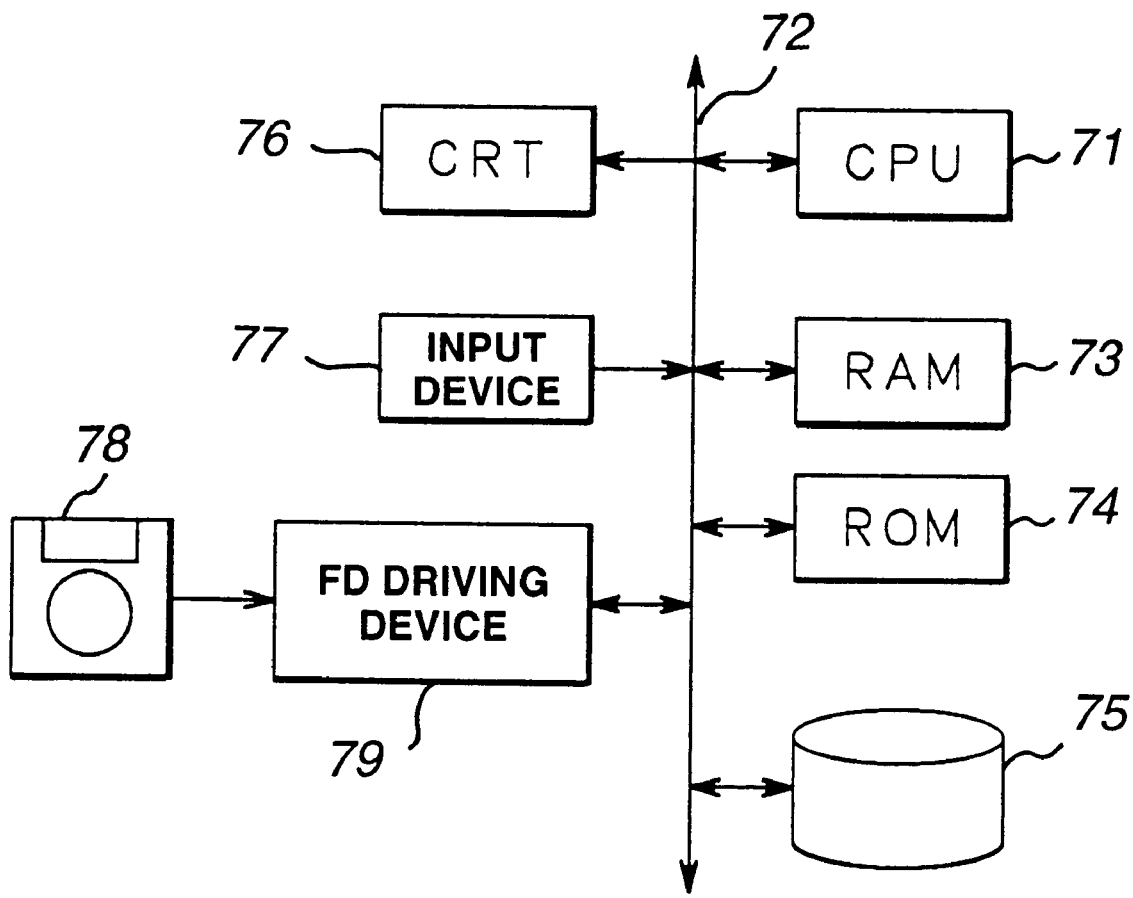
FIG. 17 is a block diagram showing an illustrative structure of a drawing device embodying the invention.

FIG. 17 shows an illustrative structure employing an embodiment of the present invention.

In the drawing apparatus shown in FIG. 17, there is provided a CPU 71 for shape approximation control as described above. To this CPU 71 are connected, over a bus line 72, a RAM for transient storage 73 and a ROM 74 having stored therein programs or data. To the bus line 72 are connected a hard disc device 75 such as a large capacity recording medium, a cathode ray tube (CRT) 76 for picture display, an input device 77 such as a keyboard or mouse and a floppy disc drive 79 for recording/reproducing a floppy disc 78 as an exchangeable recording medium.

For performing the above-described shape approximation, the CPU 71 arrays a previously acquired hierarchy approximating model in a storage device, such as RAM 73 shown in FIG. 17, and respective models are sequentially switched responsive to information items such as apparent model size on the screen, speed, display device or the viewing point of the viewer. The storage device may be an electronic memory, such as RAM 73, or a fixed medium, such as a hard disc 75. The model may be an approximated model, fabricated in advance, or may be approximated in real-time and used for drawing.

As a functional portion realized by software by the computer system inclusive of the CPU 71, there may also be provided the above-described approximated result management portion or picture data confirming portion. The approximated result management portion displays the results of approximation of the shape data by an interconnected tree structure for clarifying the relation of cause and effect for supervising the approximation shape data. The picture data confirming portion approximates by removing edges an optional number of times from the shape data when affixing the picture data to the shape data for approximation. The picture data confirming portion displays or records the affixing area to the shape data after approximation on the picture data for discerning how the picture data are changed on affixture for confirming the results of approximation of the shape data affixed to the picture data. With the above structure, the partial approximation or designation of the approximation degree can be facilitated, responsive to the intention of the user, at the time of approximation of shape data used for CG. With the picture data affixed to the shape model, the user can easily ascertain the affixing st ate. The user also can easily comprehend the relation of cause and effect in the shape model approximation. The demand for high-speed drawing and high-quality drawing can be met simultaneously by using the figure data obtained in accordance with the present invention.

Figure 18:
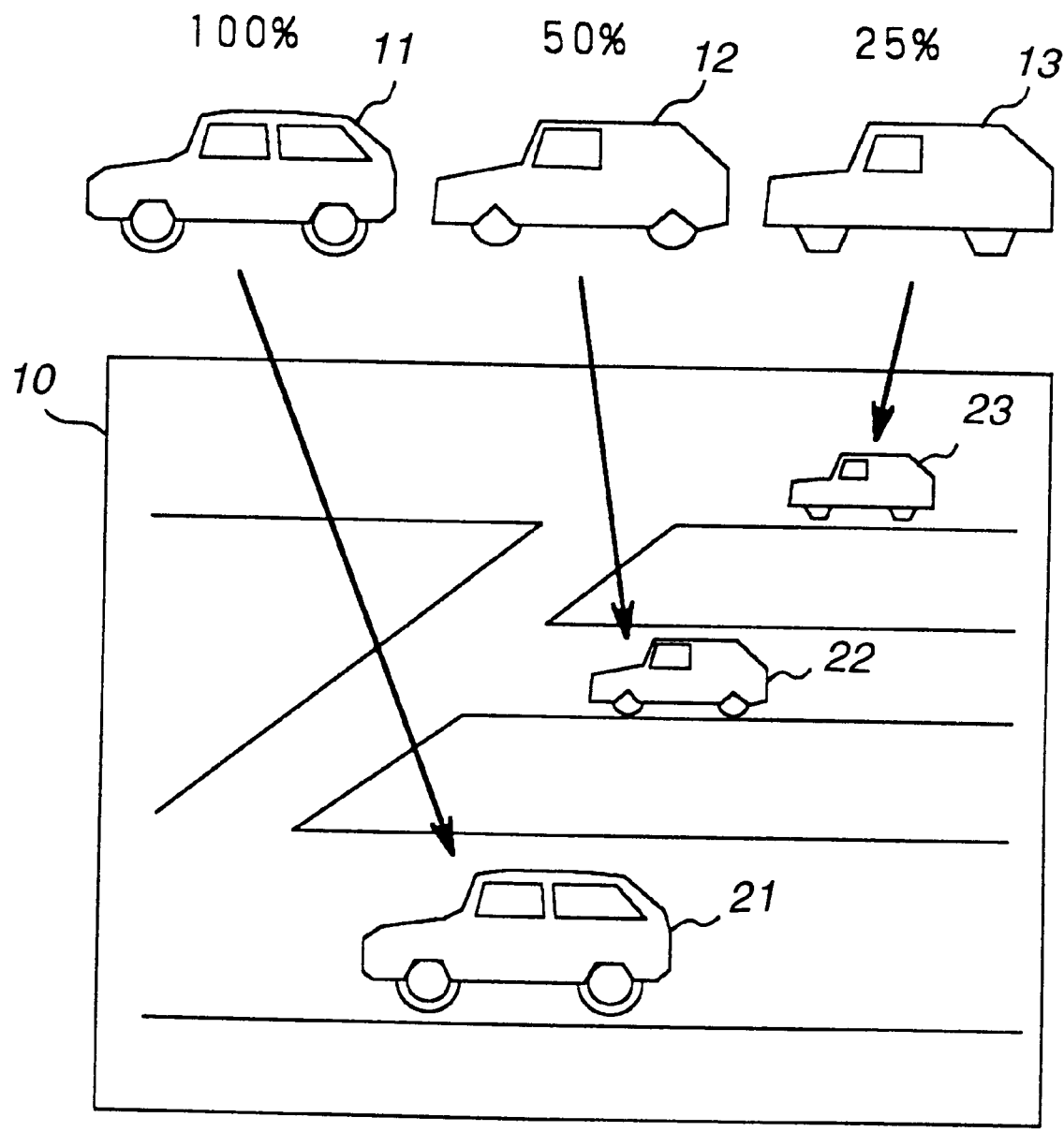
FIG. 18 illustrates shape data approximated in accordance with the present invention and corresponding display examples.
Figure 19:
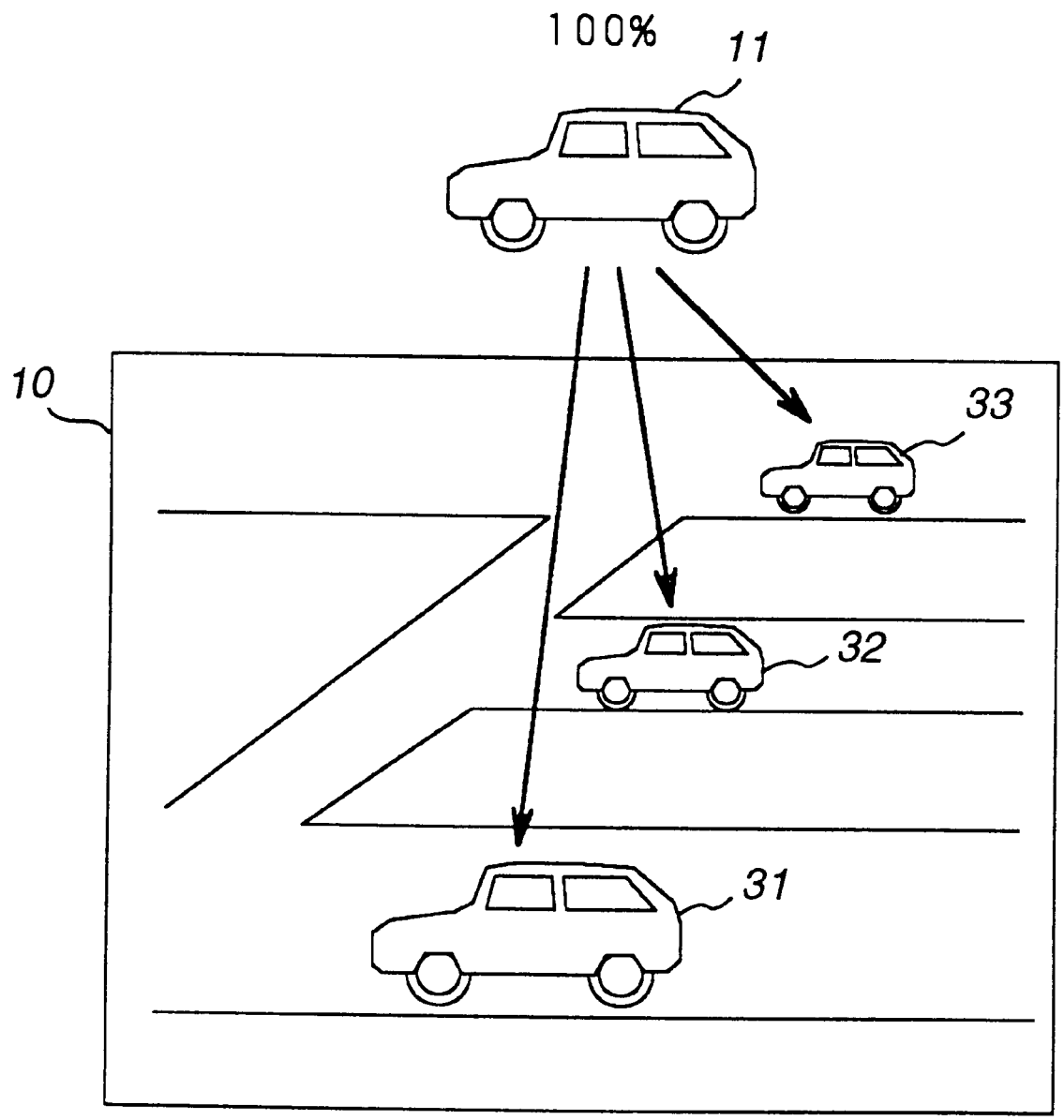
FIG. 19 illustrates a display example by the conventional technique.

FIGS. 18 and 19 show a picture drawn using the approximation technique of shape data explained in connection with the embodiment of the present invention and a picture drawn without using conventional approximation, respectively. In conventional drawing, models 31, 32 and 33 at the respective positions in the display screen 10 are drawn using the same model at all times as shown in FIG. 19 without regard to the position, size or depth of the model 11, viewing point of the viewer or the moving speed of the model. However, the same model is not necessarily needed for drawing. Conversely, not only the detailed model 11 of the original, but also more simplified models 12, 13 may be used for realizing a sufficient picture quality, provided that these models are switched as shown in FIG. 18 depending on the position, size or depth of the model 11, viewing point of the viewer or the moving speed of the model.

In approximating such models, the models can be approximated to reflect the intention of the user or the designer by approximating optional areas in the model preferentially or non-preferentially depending on the designation from the user. By clarifying the relation of cause and effect between the original model being approximated and the results of approximation, it can be easily identified which result is obtained by using which model for approximation. Since the object of affixing the picture data is varied by approximation of the shape model, it becomes necessary to comprehend how the picture data affixed to the original model is changed in the model for approximation. In short, since the shape data, as the object of affixing the picture data, is changed, the method of affixing the picture data is also changed. By clarifying which portion of the picture data is affixed to which surface of the shape data, it becomes possible to facilitate the processing of correcting the approximated shape model or, conversely, to correct the picture data.

By approximating the shape model used in CG while maintaining its global shape, the data volume can be diminished. By utilizing this, CG drawing can be performed extremely speedily while maintaining the quality of the CG drawing. Morever, the number of models, on which limitations were placed due to drawing time constraint, can be increased for drawing, while the drawing quality can be maintained. The present invention can be extensively applied in a game employing the CG, virtual reality or designing.

What is claimed is:

1. A method of approximating shape data to a desired fineness degree, comprising the steps of:

designating information concerning a degree of fineness of approximation for a desired portion of the shape data, wherein importance information is used as the information concerning the degree of fineness of approximation; and hierarchically approximating the desired portion of the shape data using the designated information concerning the degree of fineness of approximation, wherein evaluation values for one of surfaces, edges and apex points of each portion of the shape data representing a degree of importance in representing the shape data, are found, and wherein the step of approximating is controlled using said evaluation values and the importance information based on designation by a user.

2. The approximation method of claim 1, wherein:

in said designating step, weighting coefficients multiplied with said evaluation values are used as the information concerning the degree of fineness of approximation; and the degree of importance is partially adjusted depending on relative magnitudes of the weighting coefficients.

3. The approximation method of claim 1, wherein:

in said designating step, information specifying a position in a sequence of importance of said evaluation values arrayed in an order of the degree of importance is used as the information concerning the degree of fineness of approximation; and in said approximating step, a substitute evaluation value corresponding to the position in the sequence is substituted for one of said evaluation values as concerns the desired portion of the shape data designated by the user prior to proceeding to approximation for partially adjusting the degree of importance.

4. The approximation method of claim 3, wherein the position in the sequence is given as a certain proportion relative to all the shape data.

5. The approximation method of claim 3, wherein the position in the sequence is designated by a number as counted from one of a maximum one of the evaluation values or from an initial side.

6. The approximation method of claim 3, wherein the position in the sequence is a histogram position of one of the evaluation values in a histogram, said histogram position being changeable for controlling the approximation.

7. The approximation method of claim 1, wherein in said approximating step, a color of the desired portion of the shape data designated in the designating step is varied for display for distinguishing the desired portion for controlling the approximation of the desired portion.

8. The approximation method of claim 1, wherein:

in said approximating step, when designating a change of partial degree of approximation in the designating step, a user designates optional portions including one of surfaces, edges and apex points of the shape data, with neighboring portions of the shape data neighboring to the optional portions being included in the desired portions designated by the user; and an extent of enlarging the neighboring portions, that is a broadness of the neighboring portions, is determined by designation by the user.

9. The approximation method of claim 8, wherein the enlarged neighboring portions are one of a portion having similar apex points as those of the optional portions, a portion co-owning similar sides as those of the optional portions, and a portion obtained on recursively enlarging said neighboring portions.

10. The approximation method of claim 1, wherein a target of an extent of approximation is decreased to a value bearing a certain proportion with respect to a number of one of apexes, surfaces and edges of the shape data being approximated and a certain value is pre-set as said certain proportion.

11. The approximation method of claim 10, wherein the target of the extent of approximation is decreased to the value bearing the certain proportion with respect to the number of one of apexes, surfaces and edges of the shape data being approximated and the certain value pre-set as said proportion by a user is optionally changed and set.

12. The approximation method of claim 1, wherein:

in said approximating step, a symmetry of the shape data being approximated is designated by a user by an index including at least one of a surface, a line or a point; and shape approximation is carried out based on the index such as to maintain the symmetry of the shape data.

13. The approximation method of claim 1, wherein a result of approximation of the shape data is displayed by an interconnected tree structure for supervising each of the approximated shape data.

14. The approximation method of claim 1, wherein:

in affixing picture data to said shape data, said step of hierarchically approximating is carried out by removing edges from said shape data an optional number of times; and an affixing area for the approximated shape data is displayed on the picture data.

15. A method of approximating shape data, comprising the steps of:

approximating the shape data to a desired degree of fineness; and displaying a result of approximation of the shape data by an interconnected tree structure for clarifying a relation of cause and effect for supervising each of the approximated shape data.

16. The approximation method of claim 15, wherein the relation of cause and effect of each result of approximation of the shape data is recorded.

17. A method of approximating shape data to which is affixed picture data, comprising the steps of:

affixing the picture data to said shape data;

approximating the shape data by removing edges from said shape data an optional number of times; and displaying the picture data to distinguish how the picture data has been changed on being affixed to the surfaces corresponding to the approximated shape data.

18. A drawing apparatus for approximating shape data to a desired degree of fineness, comprising:

edge removal decision means for determining which edge of the shape data is to be removed for approximation;

designating means for designating information concerning a degree of fineness of approximation for a desired portion of the shape data, wherein importance information is used as the information concerning the degree of fineness of approximation; and shape approximation controlling means for hierarchically approximating the shape data using the designated information concerning the degree of fineness for the desired portion of the shape data, wherein evaluation values for one of surfaces, edges and apex points of each portion of the shape data representing a degree of importance in representing the shape data, are found, and wherein the approximation is controlled using said evaluation values and the importance information based on designation by a user.

19. The drawing apparatus of claim 18, wherein in said designating means, weighting coefficients multiplied to said evaluation values are used as the information concerning the degree of fineness of approximation, and the degree of importance is partially adjusted depending on the relative magnitudes of said weighting coefficients.

20. The drawing apparatus of claim 18, wherein:
information specifying a position in a sequence of importance of said evaluation values arrayed in an order of the degree of importance is used as the information concerning the degree of fineness of approximation; and
said approximation means substitutes, prior to proceeding to approximation for partially adjusting the degree of importance, a substitute evaluation value corresponding to the position in the sequence for one of the evaluation values as concerns the desired portion of the shape data designated by the user.

21. The drawing apparatus of claim 18, further comprising: approximated result supervising means for displaying a result of the shape data by an interconnected tree structure for supervising each of the approximated shape data.

22. The drawing apparatus claim 18, further comprising:
picture data ascertaining means for approximating the shape data by removing edges an optional number of times from the shape data when affixing picture data to said shape data for at least one of displaying and recording an affixing portion of the approximated shape data on the picture data for ascertaining approximated results of the approximated shape data carrying the picture data.

23. An information recording medium having stored therein a computer program for controlling a computer to execute processing for approximating shape data to a desired fineness degree, comprising:
a step of designating information concerning a degree of fineness of approximation for a desired portion of the shape data, wherein importance information is used as the information concerning the degree of fineness of approximation; and
a step of hierarchically approximating the desired portion of the shape data using the designated information concerning the degree of fineness of approximation, wherein evaluation values for one of surfaces, edges and apex points of each portion of the shape data representing a degree of importance in representing the shape data, are found, and wherein the step of approximating is controlled using said evaluation values and the importance information based on designation by a user.

24. A method of approximating shape data to a desired fineness degree, comprising the steps of:
displaying shape data corresponding to a two-dimensional representation of a three-dimensional object;
designating by a user a portion of said shape data and a degree of fineness of approximation for the designated portion of said shape data, wherein said portion of said shape data is less than all of said shape data;
approximating the designated portion to the designated degree of fineness; and
displaying approximated shape data, wherein said approximated shape data includes the approximated designated portion and said shape data other than the designated portion.

25. The method of claim 24, wherein picture data is associated with said shape data, said method further comprising:

displaying a representation of said picture data as related to the approximated shape data, wherein said representation represents how a portion of said picture data will appear when displayed with the approximated shape data; and
displaying said portion of said picture data corresponding to the approximated shape data in association with the displayed approximated shape data.

26. The method of claim 24, further comprising:
displaying a hierarchical structural relationship between said shape data and said approximated shape data.

27. The method of claim 24, further comprising:
designating by said user a degree of proximity, wherein said degree of proximity results in an enlarged portion of said shape data and said step of approximating is also performed on said enlarged portion, and wherein said approximated shape data further includes the approximated enlarged portion.

28. The method of claim 24, further comprising:
designating by said user a proportion of approximation for successive approximations of said shape data; and
successively approximating said shape data using said proportion of approximation to generate a plurality of approximated shape data, wherein said plurality of approximated shape data is smaller than a geometric sum based on said proportion of approximation.

29. A computer-readable medium containing a computer program for controlling a processor to execute processing comprising the steps of:
displaying shape data corresponding to a two-dimensional representation of a three-dimensional object;
designating by a user a portion of said shape data and a degree of fineness of approximation for the designated portion of said shape data, wherein said portion of said shape data is less than all of said shape data;
approximating the designated portion to the designated degree of fineness; and
displaying approximated shape data, wherein said approximated shape data includes the approximated designated portion and said shape data other than the designated portion.

30. The computer-readable medium of claim 29, wherein picture data is associated with said shape data, said processing further comprising:
displaying a representation of said picture data as related to the approximated shape data, wherein said representation represents how a portion of said picture data will appear when displayed with the approximated shape data; and
displaying said portion of said picture data corresponding to the approximated shape data in association with the displayed approximated shape data.

31. The computer-readable medium of claim 29, said processing further comprising:
displaying a hierarchical structural relationship between said shape data and said approximated shape data.

32. The computer-readable medium of claim 29, said processing further comprising:
designating by said user a degree of proximity, wherein said degree of proximity results in an enlarged portion of said shape data and said step of approximating is also performed on said enlarged portion, and wherein said approximated shape data further includes the approximated enlarged portion.

33. The computer-readable medium of claim 29, said processing further comprising:

designating by said user a proportion of approximation for successive approximations of said shape data; and successively approximating said shape data using said proportion of approximation to generate a plurality of approximated shape data, wherein said plurality of approximated shape data is smaller than a geometric sum based on said proportion of approximation.

34. An apparatus for approximating shape data to a desired fineness degree, comprising:

a monitor configured to display shape data corresponding to a two-dimensional representation of a three-dimensional object;

an input device operable by a user to designate a portion of said shape data and a degree of fineness of approximation for the designated portion of said shape data, wherein said portion of said shape data is less than all of said shape data; and a processor configured to approximate the designated portion to the designated degree of fineness, wherein said monitor is further configured to display the approximated shape data, and wherein said approximated shape data includes the approximated designated portion and said shape data other than the designated portion.

35. The apparatus of claim 34, wherein picture data is associated with said shape data, wherein:

said processor is further configured to generate, and said monitor is further configured to display, a representation of said picture data as related to the approximated shape data, wherein said representation represents how a portion of said picture data will appear when displayed with the approximated shape data; and said monitor is still further configured to display said portion of said picture data corresponding to the approximated shape data in association with the displayed approximated shape data.

36. The apparatus of claim 34, wherein:

said monitor is further configured to display a hierarchical structural relationship between said shape data and said approximated shape data.

37. The apparatus of claim 34, wherein:

said input device is further operable by said user to designate a degree of proximity, wherein said degree of proximity results in an enlarged portion of said shape data and said CPU is further configured to approximate said enlarged portion, and wherein said approximated shape data further includes the approximated enlarged portion.

38. The apparatus of claim 34, wherein:

said input device is further operable by said user to designate a proportion of approximation for successive approximations of said shape data;

said processor is further configured to successively approximate said shape data using said proportion of approximation to generate a plurality of approximated shape data, wherein said plurality of approximated shape data is smaller than a geometric sum based on said proportion of approximation.

* * * * *